US007449989B2

(12) United States Patent
Smith et al.

(10) Patent No.: US 7,449,989 B2
(45) Date of Patent: Nov. 11, 2008

(54) COMPUTERISED IDENTITY MATCHING MANAGEMENT

(75) Inventors: Craig Gregory Smith, New South Wales (AU); John Andrew Grimes, Australian Capital Territory (AU)

(73) Assignee: Argus Solutions Pty Ltd., Milsons Point, New South Wales (AU)

( * ) Notice: Subject to any disclaimer, the term of this patent is extended or adjusted under 35 U.S.C. 154(b) by 127 days.

(21) Appl. No.: 10/467,034

(22) PCT Filed: Nov. 25, 2002

(86) PCT No.: PCT/AU02/01579

§ 371 (c)(1),
(2), (4) Date: Aug. 1, 2003

(87) PCT Pub. No.: WO03/046819

PCT Pub. Date: Jun. 5, 2003

(65) Prior Publication Data

US 2004/0061592 A1    Apr. 1, 2004

(30) Foreign Application Priority Data

Nov. 26, 2001    (AU) ................................ PR9121

(51) Int. Cl.
G05B 23/00    (2006.01)
G06F 7/00    (2006.01)
G08B 29/00    (2006.01)
H04B 1/00    (2006.01)
H04Q 9/00    (2006.01)

(52) U.S. Cl. ................... 340/5.82; 340/5.52; 340/5.53; 382/115; 382/116; 382/117; 713/182; 713/185

(58) Field of Classification Search ............... 340/5.82, 340/5.52, 5.53, 5.8, 825.34, 825.31; 382/115–117, 382/190; 713/182, 185, 186; 455/417
See application file for complete search history.

(56) References Cited

U.S. PATENT DOCUMENTS

| 4,641,349 A | 2/1987 | Flom et al. ..................... 382/2 |
| 5,291,560 A | 3/1994 | Daugman ........................ 382/2 |
| 6,088,450 A * | 7/2000 | Davis et al. ................... 713/182 |

(Continued)

FOREIGN PATENT DOCUMENTS

| EP | 0 973 122 A2 | 1/2000 |
| WO | WO 00/68873 | 11/2000 |

*Primary Examiner*—Brian Zimmerman
*Assistant Examiner*—Nam V Nguyen
(74) *Attorney, Agent, or Firm*—Knobbe, Martens, Olson & Bear, LLP

(57) ABSTRACT

A computerized identity matching management system including a computer receiving a request from a capture apparatus waiting to commence a biometric capture process, to initiate the capture process is disclosed. The computer responds to the request to return a message to the capture apparatus at a first instant in time, the message containing a unique code, and where receipt of the message containing the code at the capture apparatus causes initiation of the capture process. The computer, after returning a message, receives a captured biometric from the capture apparatus coded with the code, at a second instant in time. The computer operates, when the second instant is less than a predetermined time later than the first instant, to decode the captured biometric and initiate a matching process to find a match for the decoded captured biometric against records and to generate an identification code when a match is found.

13 Claims, 2 Drawing Sheets

U.S. PATENT DOCUMENTS

| | | | |
|---|---|---|---|
| 6,307,955 B1 | 10/2001 | Zank et al. | 382/121 |
| 6,332,193 B1 * | 12/2001 | Glass et al. | 713/170 |
| 6,484,260 B1 * | 11/2002 | Scott et al. | 713/186 |
| 6,510,236 B1 * | 1/2003 | Crane et al. | 382/116 |
| 6,532,298 B1 * | 3/2003 | Cambier et al. | 382/117 |
| 6,819,219 B1 * | 11/2004 | Bolle et al. | 340/5.52 |
| 6,877,097 B2 * | 4/2005 | Hamid et al. | 713/186 |
| 2002/0056043 A1 * | 5/2002 | Glass | 713/179 |

* cited by examiner

COMPUTERISED IDENTITY MATCHING MANAGEMENT

TECHNICAL FIELD

This invention concerns computerised identity matching management. Identity matching can be performed in a number of ways. The invention is concerned with managing the provision of identity matching services to enable users to gain appropriate access to various facilities or services. This invention is provided in a number of different species. First it is provided as a process, then it is provided as a unit and system. It is also provided as essential messages.

BACKGROUND ART

The iris is formed by a process of chaotic morphogenesis, which means that its final structure is randomly derived. As a result every eye is different. Even identical twins, or clones for that matter, have a unique iris in each eye. Iris scans can therefore be used to produce a biometric which will accurately identify individuals. The outlier population—those unable to use iris recognition due to eye or iris damage—is less than 2%, the smallest outlier population of any biometric.

The concept of iris recognition was developed and patented by Iridian Technologies Inc, and their concept patent U.S. Pat. No. 4,641,349 describes the use of the iris to identify individuals. U.S. Pat. No. 5,291,560 describes a method by which a biometric, including the iris pattern of an individual, can be used as the basis of an identification technique.

Briefly, the Iridian technology involves the use of an appropriate camera designed to photograph the iris of an individual user. Proprietary software associated with the camera captures the iris image and checks it is of suitable quality and that it has sufficient iris content to match successfully. This software is designed to operate only for a predetermined time after image capture commences, and the process has to be restarted if a suitable image is not obtained within that time period.

An authentication server stores as records iriscodes which are templates derived from iris images. Each record is stored with an associated customer ID number. When the server receives an image from the software, it confirms image integrity before initiating a recognition process by comparing the received iriscode with the stored iriscode records. When a match is made the server is able to issue the customer ID number of the matched record to a service provider. The match may be verification (1:1 matching) or identification (1:many matching).

The service provider is then able to access its own records to determine the identity of the individual from the customer ID number and allocate rights to that individual accordingly—for instance access rights, or rights to conduct predetermined types of transactions.

DISCLOSURE OF INVENTION

In a first aspect, the invention is a computerised identity matching management process, comprising the steps of:

a management computer receiving a request, from capture apparatus waiting to commence a biometric capture process, to initiate the capture process;

the management computer responding to the request to return a message to the capture apparatus at a first instant in time, the message containing a unique code, and where receipt of the message containing the code at the capture apparatus causes initiation of the capture process;

the management computer, after returning a message, receiving a captured biometric from the capture apparatus coded with the code, at a second instant in time; and the management computer operating, when the second instant is less than a predetermined time later than the first instant, to decode the captured biometric and initiate a matching process to find a match for the decoded captured biometric against stored records and to generate an identification code when a match is found.

The essence of the invention is the time limit imposed on the period between the issue of the unique code which initiates the capture process, and the receipt of the biometric coded with the code. The same code is only ever issued once. This time limit is determined according to the time required for the capture process, and serves to reduce the possibility of the introduction of a false biometric. For instance a time limit of ninety seconds has been found to be suitable when an iris biometric is to be captured.

In a second aspect, the invention is a computerized identity matching management unit, comprising:

a management computer programmed to receive a request, from capture apparatus waiting to commence a biometric capture process, to initiate the capture process.

The computer is also programmed to respond to the request to return a message to the capture apparatus at a first instant in time, the message containing a unique code, and where receipt of the message containing the code at the capture apparatus causes initiation of the capture process.

The computer is also programmed to receive a captured biometric coded with the code at a second instant in time, after the first instant.

The computer further being programmed, when the second instant is less than a predetermined time later than the first instant, to decode the captured biometric and initiate a matching process to find a match for the biometric against stored records and to generate an identification code when a match is found.

The management computer will typically sit on a message oriented middleware (MOM) platform. The middleware platform may comprise of e-business infrastructure products such as those provided by TIBCO ActiveEnterprise. In particular TIB/Rendezvous, TIB/Adapter and TIB/Hawk. This facilitates secure and transparent communications between capture apparatus, such as an Iridian camera installation where a user has an iris biometric captured, an authentication server together with its own secure database, also available from Iridian, where matching takes place, and a service providers computer system which holds records of users and their access rights.

A network of distributed management computers could be employed with the nearest computer being used for each identity check. This allows for load sharing, redundancy and minimization of network latency. Of course, the management computer could be combined with an authentication server. It may also be incorporated into the service provider's computer system if required. In this case networked further computers could be made available for off-site redundancy.

In a third aspect, the invention is a computerized identity matching management system, comprising the unit in combination with an authentication server to perform the matching process to find a match for the biometric against stored records and to generate an identification code when a match is found.

The system may also be incorporated with a service providers computer system.

The management computer need hold no personal or account details of the users. It may receive no data other than any identity information provided by the user in using the identity matching process, or routed back from the authentication computer to the service provider. As a result, users do not risk their privacy when having their identity checked. In fact the management computer provides a privacy protection layer for both user and service provider.

In addition, the management computer separates the identity matching process from the subsequent application run between the user and the service provider. The only link being any information provided by the user when using the identity matching process.

In a more detailed identity matching process, the user may access the service provider's website, and then launch a client program of the management computer resident on the website. The client sends a request to the management computer for a 'message authentication code', and the management computer responds by sending a unique code having a predetermined time proscription.

At the website the client receives the code and initiates the Iridian proprietary software to capture an image of the user's iris. The captured image may be encrypted, compressed and coded with the message authentication code. It is then packed with any required identifiers and sent back to the management computer.

The management computer receives the package, checks it for validity, in particular whether the code is still valid. It also checks for integrity. It is decompressed and decrypted and the image is then passed to an authentication server for matching. The image may be directly matched, or a template may be generated from it, say by using the Daugman Algorithm, and the template matched.

If the match is made, an identifier is retrieved from the authentication server and provided to the service provider. The service provider looks up its own records using the identifier to determine who the user is and what access or transaction rights they are to be allowed.

Two applications currently exist in Australia for the management computer, AKITA (formerly iService) and GIDDiY. There are also bespoke applications which will support the management computer.

In a fourth aspect the invention is an electronic message for transmission by a management computer during a computerized identity matching process to biometric capture apparatus after the management computer has received a request, from the capture apparatus, to initiate the capture process; the electronic message comprising a unique code. Receipt of the message at the capture apparatus causes initiation of the capture process.

In a fifth aspect the invention is a second electronic message for transmission by a biometric capture apparatus during a computerized identity matching process to a management computer after the capture process has been completed. The second electronic message comprising a captured image coded with the unique code obtained from the management computer.

A computer readable storage medium storing a computer program which, when executed, performs a method of computerized identity matching management.

BRIEF DESCRIPTION OF DRAWINGS

An example of the system will now be described with reference to the accompanying drawings; in which.

BEST MODES FOR CARRYING OUT THE INVENTION

Figure 1:
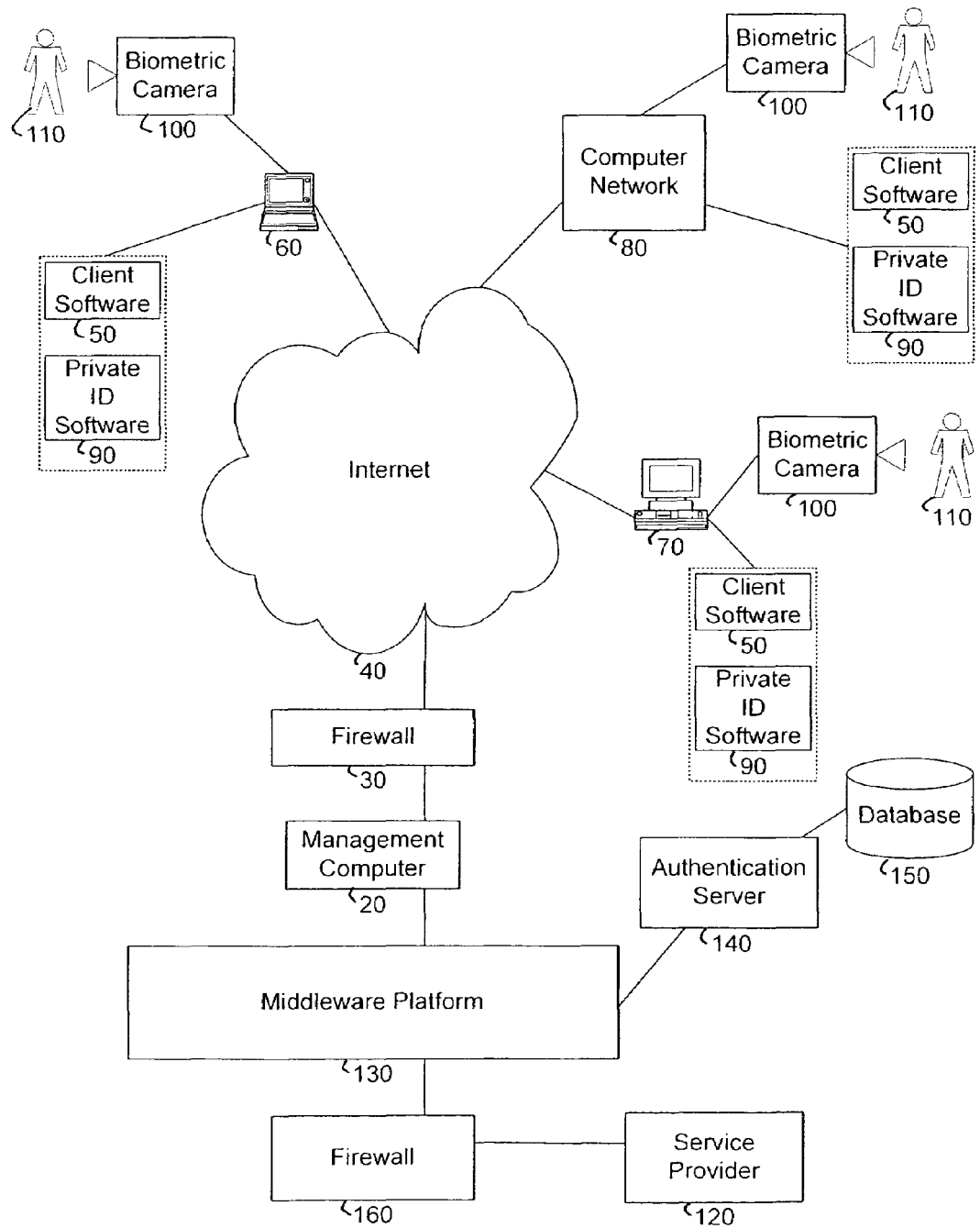
FIG. 1 is a schematic diagram of a computerized identity matching management system and its working environment.

FIG. 1 is an overview of the elements required to perform a computerized identity matching management process. At the heart of the elements is a management computer 20 programmed to receive and transmit messages through a firewall 30 and over the Internet 40 to client software 50. The client software 50 may reside in a laptop 60 or PC 70 for personal use, on a network 80 for access by many users, or on any application with processor dependent functions. In any event, the client software 50 works together with Iridian PrivateID software 90 and an Iridian Technologies iris recognition camera 100, such as the (Panasonic) Authenticam. (The process of supporting an identification management function is not restricted to biometric interfaces, nor is it restricted to the KnoWho Authentication Server(KWAS)). The Authenticam™ video camera is specifically designed for use in iris recognition. Its features include:

A specialized lens to photograph the iris.
A base that rests on the user's computer or monitor.
A USB connection to the user's computer.
An auxiliary lens to support standard video-conferencing applications.
Safety—meeting the appropriate requirements for a consumer camera.

The management computer 20 will typically sit on a middleware platform 130. The middleware platform 130 comprises e-business infrastructure products such as those provided by TIBCO ActiveEnterprise. In particular TIB/Rendezvous, TIB/Adapter and TIB/Hawk.

TIB/Rendezvous provides the following benefits:
Subject-based addressing (network details are hidden).
Allows for fast application development.
Provides platform independence at the hardware, operating system, network configuration and protocol levels.
Component processes can be removed, replaced or added without downtime.
Applications can scale easily.
Location transparency.
Provides anonymous communication between clients/hosts.
Transparent coexistence with other communications protocols on the same computers and networks.
Low overheads, C library size <100 kB, programs in the vicinity of 64 kB, communications executable daemon of 100 kB.
Is thread safe, multiple processor safe.
Supports Multicast addressing.
Distributed licensing.

TIB/Adapter is built so as to connect the Iridian KnoWho Authentication Server 140 to the TIB. The TIB/Iridian Adapter allows a "no-coding" approach to integration with the TIB.

TIB/Hawk is a tool for monitoring and managing distributed applications and systems within a network. System administrators can use it to monitor application parameters, behavior and loading for all nodes, and take action when pre-defined conditions occur. Using it, runtime failures can be repaired automatically within seconds of their discovery, reducing downtime.

The Iridian Technologies KnoWho Authentication Server 140 accepts the iris image sent from a camera, confirms the image integrity, and then sends it through the iris recognition process for verification against records stored in its cache, which in turn is drawn from the secure database 150. Verification may involve 1:1 matching or 1:many identification, depending upon the strategy needed by the service provider's Transaction Application.

The database 150 stores three types of biometric information with the Subject's ID number:
- iriscode templates (left or right eye or both) in cache and on disk
- Iris images (left or right eye or both) on disk—optional. Is used for re-enrolment purposes
- Portrait images (JPEGs of a VGA image, ~20 KB) on disk—optional.

The KnoWho Authentication Server does not store personal data, but does index each iriscode template with a customer ID number (CIN), preserving privacy. The iriscode record is not available to the client that communicates the iris image.

The customer ID is then forwarded to the service provider 120 back through the middleware platform 130 and a firewall 160.

Figure 2:
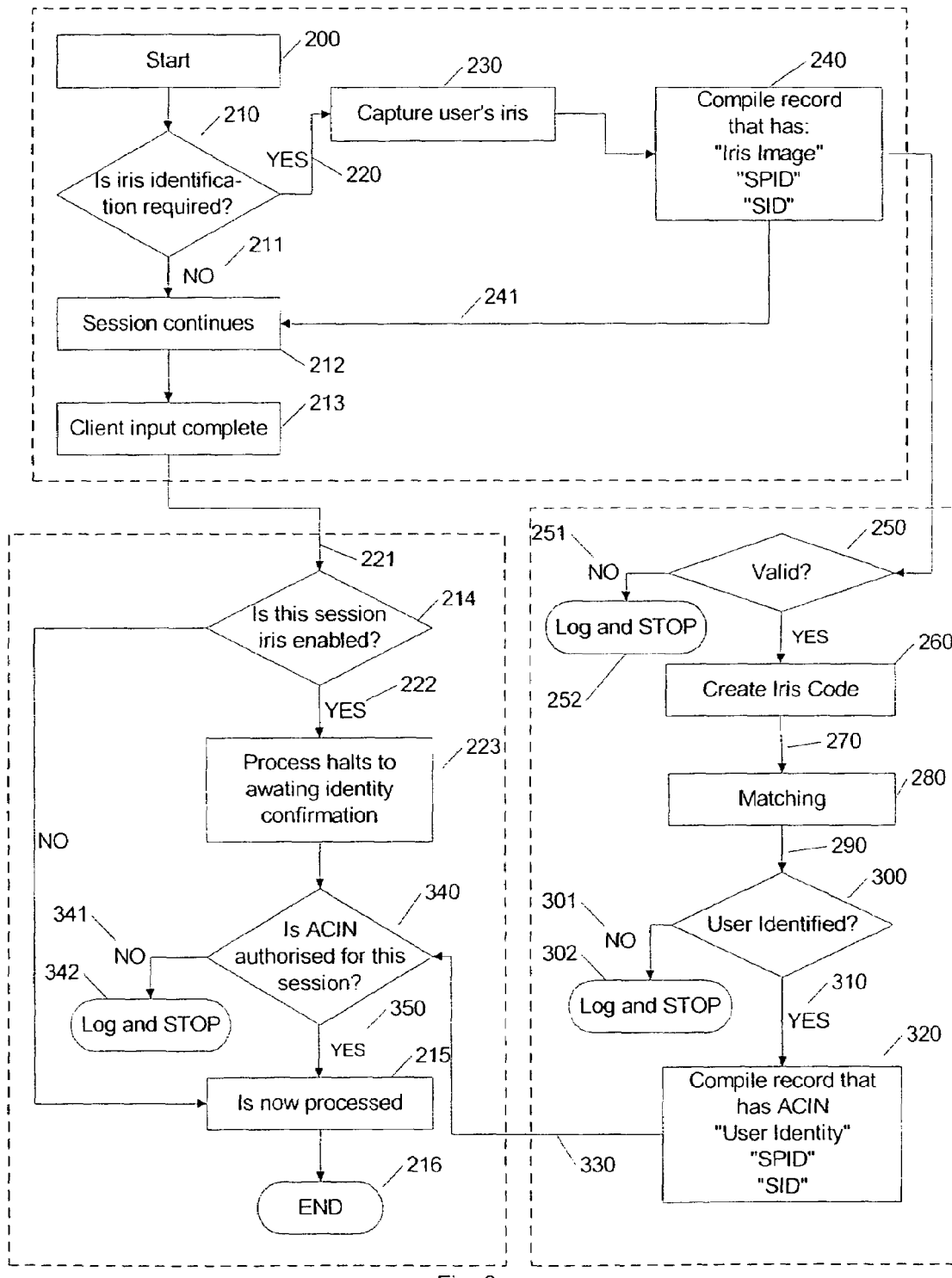
FIG. 2 is a flow chart showing the operation of a computerized identity matching management process.

When a user 110 wishes to access the services of a service provider 120, they launch the service provider's website and/or application and start a session 200, as shown in FIG. 2.

The website requires session based identification (could be transaction based identification) and requests the user to select to use a conventional username/password, or the biometric identification service 210.

In the event that the user selects conventional identification 211, the session may continue 212 in a conventional fashion. The client input is completed 213, the service provider session is not enabled for biometric identity matching 214 and the session is able to be processed 215 to its conclusion 216—none of which is of interest to this example of the invention.

In the event that the biometric identification service is selected 220, the client software 50 is launched and captures the Iridian PrivateID software 90 to take control of the video camera 100. The client also puts the session on hold.

Then the client software 50 sends a request to management computer 20 for a Message Authentication Code (MAC).

The management computer 20 responds to the client request and issues a MAC. The MAC has variable time validity and is unique (i.e.: is only ever issued once).

The client software 50 receives the MAC and the PrivateID 90 processes commence to capture an iris image.

To use the Authenticam camera 100 the user 110 moves their head so that the eye being photographed is 43-48 cm (17 to 19 inches) from the lens. The video camera sends images to the software running on the user's laptop. The Authenticam camera responds to a software power-on command. Then an image capture module is launched.

The PrivateID software captures a series of digital video images of the Subject's eye. Image quality metrics within the PrivateID software inspect the images for sufficient quality and iris content to ensure high confidence for a successful match outcome. Once a satisfactory image has been culled 230, the software provides an audible signal to inform the user that the image capture session is complete, this usually issues within seconds. If a satisfactory image cannot be captured within the allotted time (the default is set at 10 seconds), then the software provides an error signal to the Transaction Application. The Subject would then have to restart the process.

The client software 50 encrypts the captured image using an appropriate cryptographic algorithm. Then it compresses the captured image, codes the compressed image using the previously issued MAC, collects a pre-determined session identifier (SID) and service provider identifier (SPID) and assembles a message 240 for transmission to the management computer 20.

The client also provides a message 241 to allow the transaction to continue, and the service provider is enabled for biometric identity matching 222. The service provider then waits 223.

The management computer receives the message and checks it for validity using MAC, that is to ensure it has been received while the MAC is still valid 250. If it is not valid 251 then the process stops 252.

The message then has its integrity checked using a checksum, and is decompressed and decrypted. It is then passed through a Daugman Algorithm, or similar, to create an iriscode 260.

The iriscode is then sent 270, via the middleware 130, to the authentication server 140 which attempts to match it 280 with a record in its secure database 150. The authentication server returns a result 290. The management computer interprets the result 300. If the result is a comparison failure 301, that result is logged and the process stops 302.

If the match is a success 310 the management computer receives the Customer Identification Number (ACIN) associated with the matched record back from the authentication server 140, via the middleware layer 130.

The management computer then assembles a message 320 containing the Customer Identification Number (ACIN) and the session identifier (SID), and sends this 330 to the service provider 120, via a second firewall 160, using the service provider identifier (SPID) to address it.

The service provider 120 has been enabled to receive a biometric identification signal and responds to the message from the management computer 20 by checking 340 whether the session identifier (SID) and Customer Identification Number (ACIN) are appropriate for the session or not. It does this by checking its own database to determine the rights available to the user having the ACIN found from matching. If that user does not have the appropriate rights for the session 341 the event is logged and the session ended 342.

In the event the customer has the right to conduct that session 350, they are permitted to proceed with the session transactions 215, and when they are finished the session ends 216.

Although FIG. 1 shows the management computer running at a single facility, in reality there would be multiple facilities for load sharing, redundancy and minimization of network latency.

Although the invention has been described with reference to a particular example it should be appreciated that it may be operated in other ways. For instance, a Turnkey solution may alternatively be provided where a service provider houses the management computer on their own premises together with an AKITA application. Here the individual transactions of an application could require user identity matching before they can be performed. In this case transaction identifiers are sent to the management computer with the coded images, rather than session identifiers.

In a Guaranteed Identification Do it Yourself (GIDDiY), the users create their own 'customer identification numbers' (ACINs), independent of third parties, and store them at trusted locations.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of performing a computerized identity matching management process, comprising:

receiving a request from a capture apparatus;

responding to the request to return a message to the capture apparatus at a first instant in time, the message containing a unique code, wherein receipt of the message at the capture apparatus causes initiation of a biometric capture process;

after returning a message, receiving an encrypted biometric signal from the capture apparatus, wherein the encrypted biometric signal is coded, subsequent to the encryption, with the unique code at the capture apparatus, at a second instant in time; and when it is determined, based on the unique code, that the second instant is less than a predetermined time later than the first instant, decrypting the biometric signal and initiating a matching process to find a match for the decrypted biometric signal against stored records and generating an identification code when a match is found.

2. The method of claim 1, wherein the predetermined time is determined according to the time required for the biometric capture process.

3. The method of claim 1, further comprising checking the integrity of the encrypted biometric signal.

4. The method of claim 1, further comprising generating a template image of the decrypted biometric signal for matching against stored records.

5. The method of claim 1, further comprising providing the identification code to a service provider for comparison against a second set of stored records.

6. A computer readable storage medium storing a computer program which, when executed, performs a method of computerized identity matching management, the method comprising:

receiving a request from a capture apparatus;

responding to the request to return a message to the capture apparatus at a first instant in time, the message containing a unique code, wherein receipt of the message at the capture apparatus causes initiation of a biometric capture process;

after returning a message, receiving an encrypted biometric signal from the capture apparatus, wherein the encrypted biometric signal is coded, subsequent to the encryption, with the unique code at the capture apparatus, at a second instant in time; and when it is determined, based on the unique code, that the second instant is less than a predetermined time later than the first instant, decrypting the biometric signal and initiating a matching process to find a match for the decrypted biometric signal against stored records and generating an identification code when a match is found.

7. The medium of claim 6, wherein a network of distributed management computers perform the method.

8. The medium of claim 7, wherein a privacy protection layer is located between the management computer and at least the capture apparatus.

9. The medium of claim 8, wherein a message oriented middleware platform is in communication with the, or each, management computer for facilitating secure communication between the management computers and at least the capture apparatus.

10. A computerized identity matching management system, comprising:

means for receiving a request from a capture apparatus;

means for responding to the request to return a message to the capture apparatus at a first instant in time, the message containing a unique code, wherein receipt of the message at the capture apparatus causes initiation of a biometric capture process;

means for, after returning a message, receiving an encrypted biometric signal from the capture apparatus, wherein the encrypted biometric signal is coded, subsequent to the encryption, with the unique code at the capture apparatus, at a second instant in time; and means for, when it is determined, based on the unique code, that the second instant is less than a predetermined time later than the first instant, decrypting the biometric signal and initiating a matching process to find a match for the decrypted biometric signal against stored records and generating an identification code when a match is found.

11. The system of claim 10, further comprising an authentication server configured to perform the matching process to find a match for the biometric signal against stored records and to generate an identification code when a match is found.

12. The system of claim 11, wherein the system is configured to receive identity information data provided by a user when using the identity matching process and/or data routed back from the authentication server to a service provider such that the user does not risk their privacy when having their identity checked.

13. The system of claim 10, wherein the system is incorporated into a service provider computer system.

* * * * *

UNITED STATES PATENT AND TRADEMARK OFFICE
CERTIFICATE OF CORRECTION

PATENT NO.         : 7,449,989 B2                               Page 1 of 1
APPLICATION NO.    : 10/467034
DATED              : November 11, 2008
INVENTOR(S)        : Smith et al.

It is certified that error appears in the above-identified patent and that said Letters Patent is hereby corrected as shown below:

At Column 2, Lines 47 - 48, please change "providers" to --provider's--.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,449,989 B2 | |
| APPLICATION NO. | : 10/467034 | |
| DATED | : November 11, 2008 | |
| INVENTOR(S) | : Smith et al. | |

It is certified that error appears in the above-identified patent and that said Letters Patent is hereby corrected as shown below:

Title Page;
    In Section (73) Assignee, please change "Argus Solutions Pty Ltd." to --Argus Solutions Ltd.-- to reflect the Change of Name recorded on February 27, 2006 in Reel 017604, Frame 0396.
    In Section (73) Assignee, please delete "Milson's Point" and insert therefore, --St. Leonards--.

Signed and Sealed this
Fifth Day of July, 2011

David J. Kappos
*Director of the United States Patent and Trademark Office*